(No Model.)

E. A. G. KURTH.
DISPLAY STAND.

No. 460,876. Patented Oct. 6, 1891.

WITNESSES:
J. Henry Thieberath
C. Sedgwick

INVENTOR:
E. A. G. Kurth
BY Munn & Co.
ATTORNEYS

UNITED STATES PATENT OFFICE.

ERNEST A. G. KURTH, OF NEW YORK, N. Y.

DISPLAY-STAND.

SPECIFICATION forming part of Letters Patent No. 460,876, dated October 6, 1891.

Application filed May 12, 1891. Serial No. 392,458. (No model.)

*To all whom it may concern:*

Be it known that I, ERNEST A. G. KURTH, of New York city, in the county and State of New York, have invented a new and useful Display-Stand, of which the following is a full, clear, and exact description.

My invention relates to an improvement in display-stands, and has for its object to provide a stand capable of being readily taken apart and packed in a small space and of being conveniently and expeditiously built up, the stand being especially adapted to display articles of various descriptions, preferably toys; and a further object of the invention is to provide a display-stand which will be exceedingly ornamental in its character and capable of use as a center-piece for a table.

Another object of the invention is to provide a means whereby a portion of the stand will be kept constantly revolving through the action of heat.

The invention consists in the novel construction and combination of the several parts, as will be hereinafter fully set forth, and pointed out in the claim.

Reference is to be had to the accompanying drawings, forming a part of this specification, in which similar figures and letters of reference indicate corresponding parts in all the views.

Figure 1:
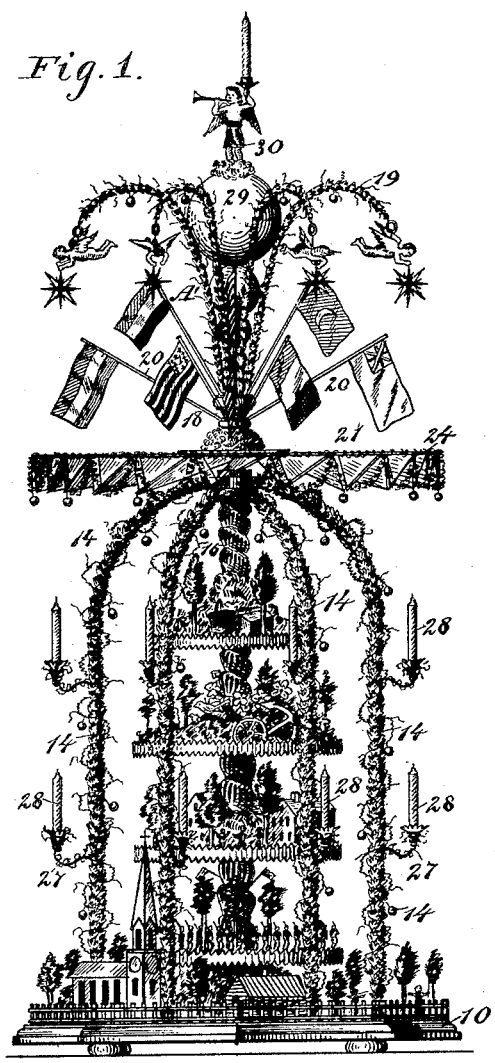
Figure 2:
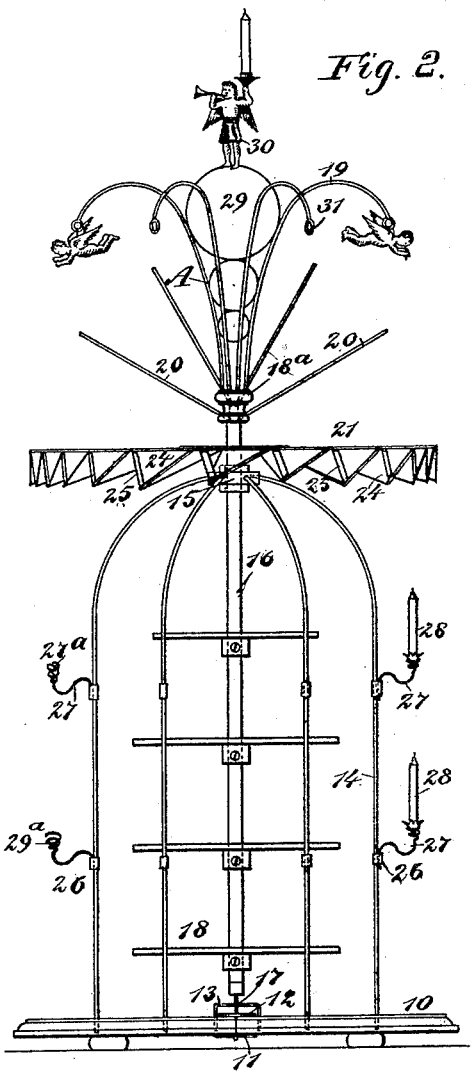
Figure 3:
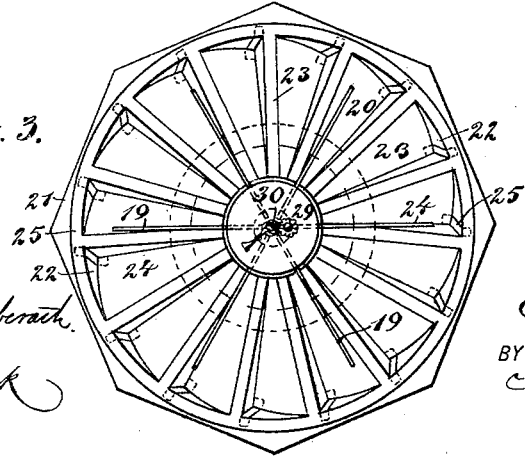

Figure 1 is a perspective view of the stand decorated and provided with a number of toys for effective display. Fig. 2 is a perspective view of the frame of the stand, the decorations and toys being removed; and Fig. 3 is a plan view of the frame of the stand.

The frame consists of a base 10, preferably circular or polygonal in shape and made in two sections, the said sections being connected by a hinge 11, of any approved construction. In the center of the base a brass disk 12 is located, or a disk of any other highly polished material, the said disk being spanned by a yoke 13, secured to the sections of the base. A series of radially-arranged apertures is produced in the base. In the upper face of the base a series of apertures is arranged, preferably in a circle, and the lower ends of a series of rods 14 are snugly fitted in the apertures. The rods extend vertically upward the greater portion of their length; but their upper ends are curved in the direction of and are attached to a central connecting-sleeve 15, as is best shown in Fig. 2. Thus a series of arches or a cage-like figure is produced by the rods, and within the space inclosed by the rods a vertical shaft 16 is located. The shaft extends upward through and beyond the sleeve 15, which sleeve serves as its upper bearing, and the lower end of the shaft is provided with a pivot-point or spindle 17, held to turn upon the polished disk 12.

Within the cage formed by the rods 14 a series of shelves 18 is adjustably located upon the shaft, and upon the upper end of the shaft a hub $18^a$, preferably of an ornamental character, is secured. The hub is provided with a series of apertures in its top and likewise with a series of apertures in its sides. In the upper apertures of the hub a series of curved arms 19 is inserted and secured. The said arms curve outward at the top in various directions, forming, essentially, a basket A, and in the side apertures of the hub a number of staffs 20 are secured, which staffs radiate from the hub in various directions, being preferably given an upward and outward inclination.

The motive power for the shaft is heat, and the shaft is revolved in the following manner: A fan-wheel 21 is firmly secured upon the shaft 16, above the cage. The wheel is of much greater diameter than the diameter of the cage and is preferably made from one piece of material, paper or sheet metal being preferably employed, the said single piece of material being provided with a series of angular cuts 22, radiating from a circle surrounding the center of the wheel; and the material separated partially from the body of the wheel by the cuts is bent downward at a right angle to the upper face of said wheel upon the score lines 23, as shown in Fig. 3, producing a series of fans 24, inclined in one direction, and the fans or blades 24 are maintained in their lower position through the medium of straps 25, attached thereto and to the body of the wheel. Upon the rods 14 a series of sockets 26 is formed, said sockets being adapted to receive candlesticks 27, in which candles 28 are placed. The candlesticks extend some distance out from the rods 14 and are preferably made to terminate at their upper ends in a spiral $27^a$, which spirals receive the cups in which the candles are placed. The heat from the candles 28 ascending strikes the fans of the fan-wheel and revolves said wheel, thereby communicating motion to the shaft 16, which, being delicately pivoted at its lower end, may be revolved through the medium above mentioned even when the shelves 18 are heavily laden.

The basket A is adapted to receive any desired article of display. Preferably, however, balls or globes 29, of different diameters, are placed therein, the upper globe being preferably provided with an ornamental candlestick 30. The curved rods 19, constituting the basket A, are provided at their upper ends with eyes 31, whereby figures or ornaments of any character may be readily attached to said bars, and the rods 20 may be decorated in any suitable or approved manner. Preferably, however, they are adapted to receive flags, as illustrated in Fig. 1.

The cage, the shelves, the shaft carrying the shelves, the basket A, and the fan-wheel 21 are adapted to be ornamented as fancy may dictate, and a sample of such ornamentation is illustrated in Fig. 1.

The display-stand is especially adapted as a toy, and may be utilized for the amusement of children as a center-piece for a table.

It is evident that the entire device may be conveniently folded when not in use and stored away in a small space, as the bars constituting the cage are removable from the base and the base folds. The basket A, and the hub $18^a$, likewise the wheel 21, are removable from the shaft, and the shaft is readily disconnected from the cage and the shelves detached therefrom.

Having thus described my invention, I claim as new and desire to secure by Letters Patent—

A knockdown toy-display stand comprising the folding base 10, formed of two sections hinged together at 11, a series of apertures in the upper face of the base, a series of rods 14, resting removably at their lower ends in said apertures and curved inward at their upper ends, a hub 15, having apertures receiving the said inward-curved ends, a shaft 16, stepped removably at its lower end on the base and passing up through said hub, the shelves 18, the fan-wheel on the shaft, and the hub $18^a$ on the upper end of the shaft and provided with apertures, substantially as set forth.

ERNEST A. G. KURTH.

Witnesses:
J. F. ACKER,
E. M. CLARK.